United States Patent Office 3,243,356
Patented Mar. 29, 1966

3,243,356
WATER-INSOLUBLE COPOLYMER OF ACYLASE WITH AN AMINO ACID ANHYDRIDE
Jiro Kirimura, Tokyo, and Toichi Yoshida, Kamakuri-shi, Kanagawa-ken, Japan, assignors to Ajinomoto Co., Inc., Tokyo, Japan
No Drawing. Filed Nov. 6, 1963, Ser. No. 321,808
Claims priority, application Japan, Nov. 10, 1962, 37/49,390; Nov. 20, 1962, 37/50,858
3 Claims. (Cl. 195—63)

This invention relates to the optical resolution of racemic amino acids and their derivatives, and more specifically to the enzymatic hydrolysis of racemic N-acyl amino acids.

It is known that acylase causes asymmetrical removal of acyl groups from acyl-DL-amino acids, and that racemic amino acids can be resolved into their optically active enantiomorphs by acylating the amino radical of the racemate, and by selectively hydrolyzing one of the acylated enantiomorphs by means of acylase. Acylase can be isolated from fungi, bacteria and from various animal tissues.

The known properties of acylase could not be utilized heretofore on an industrial scale. The isolation of acylase from its natural sources is a complex and costly procedure. The recovered acylase is water-soluble and sensitive to environmental factors which tend to deactivate the enzyme.

The water soluble enzyme is partly decomposed during removal of the acyl radical from the N-acyl-DL-amino acid. The resulting loss of enzyme is greater than is economically bearable. The decomposition products, moreover, contaminate the desired product. They are amino acids and polypeptides, and it is difficult to remove them from the amino acid that it is desired to produce.

We have found that acylase can be made insoluble in water and that its stability can be greatly increased without loss of enzyme function by copolymerizing acylase with anhydrides of certain N-carboxy-α-amino acids or derivatives thereof to produce polypeptidyl derivatives of acylase.

The copolymerization reaction may be carried out in an aqueous system buffered to a pH value between 5 and 9 at which no adverse effect on acylase activity is noticeable. The polypeptidyl derivatives of acylase obtained by the reaction is practically insoluble in water. It has approximately the same enzyme effect as equivalent amounts of unmodified acylase, and it can be stored without loss of activity over extended periods. When the modified insoluble acylase of the invention is brought into contact with acyl-DL-amino acids, the racemate is asymmetrically hydrolyzed in the same manner as with soluble acylase but the insoluble enzyme can be recovered from the hydrolyzation mixture. It does not contaminate the product and it can be used again for the hydrolysis of another batch of acyl-DL-amino acid.

The acylase to be modified by the method of the invention may be derived from any conventional source, including fungi, bacteria, and animal tissue. The modifying agents are optically active forms of N-carboxy-α-amino acid anhydride derivatives. Typical amino acids whose N-carboxy anhydride derivatives may be employed include glycine, alanine, α-amino-n-butyric acid, valine, leucine, isoleucine, phenylalanine, the β-methyl, -ethyl, and -benzyl esters of aspartic acid, and the corresponding γ-esters of glutamic acid. The modification reaction can be performed in a homogeneous liquid medium, or in a heterogeneous medium. The reaction products are practically insoluble in water.

The N-carboxy anhydrides of proline, serine, or threonine react with acylase to form polypeptidyl derivatives but these modified acylase products are water soluble and, therefore, no more useful than the unmodified acylase.

The reaction of acylase with the afore-mentioned N-carboxy amino acid anhydrides is a copolymerization reaction, as will be evident from Table 1 below, and all tested water-insoluble copolymers of acylase with optically active N-carboxy-α-amino acid anhydrides have been found effective in the manner of unmodified acylase.

The copolymerization reaction is carried out in an approximately neutral medium, that is, at a pH near 7, and preferably within the limits of pH 5 and pH 9. The pH is preferably maintained by a suitable buffer which is inert to acylase. Phosphate, bicarbonate and acetate buffers of conventional aqueous composition are typical of the buffers useful for modification of acylase according to our invention.

The reaction temperature should be kept as low as practical to avoid inactivation of the acylase, and operation at temperatures between −10 and +20° C. is preferred.

The N-carboxy-α-amino acid anhydride is dissolved or suspended in a solvent which does not affect the activity of acylase. Typical inert solvents for this purpose are dioxane, chloroform and ethyl acetate. The solution or suspension is added drop by drop to the solution of acylase in the aqueous buffer system. An acylase activator is preferably added to the reaction medium to activate and stabilize the water-insoluble modified acylase produced. Preferred activators are cobalt, calcium, or zinc ions, and cystein.

Table 1 lists the yields of water insoluble modified acylase obtained from the copolymerization of the N-carboxy anhydrides of γ-methyl L-glutamate and L-alanine with a purified fungal acylase extracted from the mycelium of *Aspergillus oryzae* in three different buffer solutions. For comparison purposes, the yields of polypeptide obtained in the absence of acylase under otherwise identical conditions is also shown.

All yields are expressed as percent of N-carboxy amino acid anhydride originally present.

TABLE 1

[Yield of polymer, percent]

| Buffer | γ-Methyl N-carboxy-L-glutamate anhydride | | N-carboxy-L-alanine anhydride | |
|---|---|---|---|---|
| | With acylase | Without acylase | With acylase | Without acylase |
| Phosphate pH 7.4 | 18.1 | 24.1 | 20.5 | 42.1 |
| Bicarbonate pH 8.5 | 20.4 | 57.0 | 31.2 | 70.5 |
| Acetate pH 7.2 +10⁻⁴$_M$CoCl$_2$ | 21.6 | 59.0 | 35.5 | 75.2 |

The concentration of the buffer solutions was adjusted to m./15 per liter.

The water-insoluble acylase obtained by the method of the invention is a white or yellowish granular material which may be pulverized in a mill. If the material is lyophilized, it can be stored over very long periods without noticeable loss in acylase activity. The material may be molded into desired shapes, such as flakes or rods, with or without inert extenders, fillers or carriers.

The enzymatic hydrolysis of racemic N-acyl amino acids by means of the water-insoluble modified acylase of the invention is carried out in the same manner as the known hydrolysis by means of water-soluble acylase. The N-acyl derivatives of amino acids are readily obtained by reaction of the amino acids with conventional acylating agents, such as acetic anhydride, benzoyl chloride, chloroacetyl chloride, carbobenzoxychloride, and the like.

The N-acylated racemic amino acid is dissolved in a buffered solution in a pH range in which the modified acylase is active, and is contacted with the modified acylase of the invention either batchwise or continuously.

The asymmetric removal of the acyl radical may be carried out at room temperature but the reaction can be hastened by operating at an elevated temperature, such as 37° C., a temperature for which thermostatic equipment is available in many laboratories. While the rate of acyl radical removal reaches an optimum in a temperature range charcteristic for each set of conditions, this temperature is not critical, as is well known from the reaction between soluble acylase and the racemates of acylamino acids.

The recovery of the optically active free amino acid from the reaction mixture also containing the insoluble modified acylase and an optically active N-acyl amino acid is carried out without difficulty by crystallization or in any other conventional manner after removal of the modified acylase. The latter may be used over and over without serious loss in activity in each cycle. The same batch of modified acylase material may be employed for sequentially hydrolyzing N-acyl DL-amino acids which differ greatly in chemical structure and properties.

When the modified acylase loses some of its activity after multiple reaction cycles, it can be regenerated by contact with the afore-mentioned activators, namely the ions of cobalt, calcium and zinc, or cystein.

The water insoluble acylase may be stored at room temperature for two weeks while immersed in an aqueous buffer solution or in water covered with toluene. No loss in activity is observed. Storage at lower temperature or storage of the material in a lyophilized state may safely be extended over long periods.

The asymmetric removal of acyl radicals from N-acyl DL-amino acids by the method of the invention can be carried out in continuous operation. A column is packed with the modified water-insoluble acylase, and a solution of the N-acyl DL-amino acid is passed through the column. The optically active amino acid is found in the column effluent, and is readily recovered therefrom. The column packing preferably includes an inert extender or carrier in addition to the modified acylase to increase the available surface of the latter and to control the rate of flow in the column. Powdered polyvinylchloride, polyethylene, polystyrene and purified diatomaceous earth are typical of the many inert and insoluble organic and inorganic extenders or carriers which may be employed.

As long as the rate of flow does not exceed the capacity of the column, the concentration of the optically active amino acid in the effluent is approximately proportional to the concentration of the N-acyl DL-amino acid in the material fed to the column. Table 2 shows the relationship between the rate of supply of N-acetyl-DL-valine and the amount of L-valine in the effluent of a column packed with a mixture of 40 grams powdered polyvinyl chloride and 1.0 grams poly-γ-methyl-L-glutamyl acylase, the product of copolymerization of acylase with γ-methyl-N-carboxy-L-glutamate anhydride having a total acylase activity of 25.2 mM./hour for acetyl-DL-valine.

TABLE 2

| Rate of percolation, ml./hour | L-valine mM. in effluent | Rate of asymmetric hydrolysis in percent of— | |
|---|---|---|---|
| | | Material fed to column | Total capacity of column |
| 2 | 0.62 | 98.5 | 0.24 |
| 5 | 1.56 | 99.5 | 6.25 |
| 10 | 3.09 | 98.2 | 12.18 |
| 20 | 6.20 | 98.5 | 24.30 |
| 40 | 12.80 | 101.8 | 42.10 |
| 60 | 20.60 | 98.8 | 80.60 |
| 80 | 24.90 | 99.1 | 98.0 |
| 100 | 22.80 | 72.6 | 90.7 |
| 200 | 18.10 | 28.8 | 72.0 |

The activity of the water-insoluble, modified acylase of the invention in selectively hydrolyzing one enantiomorph of an N-acyl-DL-amino acid can be determined in various ways. The following method has been found convenient and has been employed for determining the data given in Table 2, and elsewhere in this specification.

One milligram of the insoluble acylase is suspended in a mixture of 0.5 ml. distilled water, 0.1 ml. 0.05 molar barbiturate buffer solution at pH 7.8, and 0.5 ml. $6 \times 10^{-4}$ molar $CoCl_2$ solution. The N-acyl-DL-amino acid is dissolved in distilled water in a concentration of 50 mM./liter. The acylase suspension and the acylamino acid solution are separately brought up to a temperature of $37 \pm 0.1°$ C. by brief immersion in a thermostatically controlled water bath. They are mixed and held at the controlled temperature for 30.0 minutes. The reaction mixture is then very quickly heated in a boiling water bath to inactivate the modified acylase. A ninhydrin solution is added to the mixture, and heating proceeds for five minutes. The light absorption of the mixture is compared with a blank containing the same reagents, but free of acylase.

The activity of the modified acylase is expressed as the amount of acylated material in micromole that was hydrolyzed in 30 minutes by one milligram of the modified acylase.

The activity of poly-γ-methyl-L-glutamyl acylase on various N-acyl-DL-amino acids is shown in Table 3.

TABLE 3

| N-acyl DL-amino acid: | Activity of modified acylase (micromoles per mg. per 30 min.) |
|---|---|
| Acetyl-DL-alanine | 26.4 |
| Acetyl-DL-valine | 12.6 |
| Acetyl-DL-leucine | 15.2 |
| Acetyl-DL-glutamic acid | 7.5 |
| Acetyl-DL-methionine | 30.7 |
| Acetyl-DL-phenylalanine | 32.4 |
| ε-Benzoyl-α-acetyl-DL-lysine | 34.2 |
| Acetyl-DL-tryptophan | 31.5 |
| Chloroacetyl-DL-valine | 8.2 |
| Chloroacetyl-DL-glutamic acid | 20.8 |
| Chloroacetyl-DL-serine | 30.8 |
| Chloroacetyl-DL-threonine | 6.2 |

The optically active amino acids recovered from the hydrolysis mixture of the invention are free from contaminating other amino acids and from peptides which are unavoidably admixed to the product in an otherwise identical process employing water-soluble acylase, and which are degradation products of the enzyme.

The following examples are further illustrative of the invention, and it will be understood that the invention is not limited thereto.

*Example 1*

Acylase was prepared by extracting a mycelium of *Aspergillus oryzae*, and by purifying the extracted material in a procedure described in Example 6. The purified acylase was reacted with N-carboxy γ-methylglutamic acid anhydride, which had been prepared from γ-methyl glutamic acid in a procedure described in Example 4 in a $\frac{1}{15}$ m. acetate buffer solution at pH 7.2. The water-insoluble modified acylase recovered from the reaction mixture was rapidly powdered in a chilled mill. Polyvinyl chloride powder was separately washed with water to remove all extractable material.

40.0 grams of the polyvinvyl chloride powder and 1.0 gram of the modified acylase powder were mixed. The mixture was moistened with 0.05 m. barbiturate buffer solution at pH 8.0, and packed into a column 2 cm. in diameter and 30 cm. high. 200 milliliters of the buffer solution were passed through the column at the rate of 60 ml./hour for further washing and stabilizing the acylase.

Ten liters of an aqueous solution containing 1,000 grams N-acetyl-DL-valine and $10^{-3}$ mole cobaltous chloride were adjusted to pH 7.8 with sodium hydroxide and percolated through the column at room temperature at the rate of 60 ml./hour. The top surfaces of the percolated solution and of the effluent from the column were covered with toluene to prevent bacterial attack.

The pH of the collected effluent was adjusted to pH 5.0, and its volume was reduced to one-fifth by evaporation in a vacuum. The residue was diluted with 99.5% ethanol to the original volume. The mixture was kept in a refrigerator over night. L-valine crystallized, and the crystals were separated from the mother liquor by filtration. They were recrystallized from water and ethanol. The L-valine obtained was white and flaky. It weighed 298 grams, and its specific rotation was $[\alpha]_D^{23} = +27.2$ (c.=2%, in 5 N HCl).

The yield was 81% of that theoretically possible.

*Example 2*

One gram of the water-insoluble modified acylase prepared as described in Example 1 was admixed to one liter of an aqueous solution containing 100 grams N-acetyl-DL-alanine and $10^{-3}$ mole cobalt chloride, and adjusted to pH 7.8. The mixture was kept at 37° for 48 hours while its surface was protected by a layer of toluene. The concentration of ninhydrin-positive material in the solution was determined from time to time. When no further concentration increase could be observed, the water-insoluble modified acylase was separated from the remainder of the solution by filtration.

The pH of the filtrate was adjusted to 5.0 with acetic acid, and the filtrate was evaporated in a vacuum to 150 milliliters. The residue was mixed with 600 ml. ethanol, and the mixture was cooled whereupon L-alanine crystallized. The crystalline material was filtered off and recrystallized from aqueous ethanol. The orthorhombic L-alanine crystals obtained weighed 25.6 grams (76.7% yield). The specific rotation was $[\alpha]_D^{23} = +14.42$ (c.=6.46%, in 1 N HCl). The nitrogen content was 15.68% (by Kjeldahl's method).

The afore-mentioned acylase recovered by filtration was admixed to another one liter batch of the DL-alanine solution described above, and the same sequence of operations was performed. The pure L-alanine obtained weighed 24.4 grams (73.2% yield).

The N-carboxy-α-amino acid anhydride used in carrying out this invention is prepared by the reaction of phosgene with an optically active α-amino acid in an anhydrous and inert solvent, such as dioxane, toluene and tetrahydrofuran. The following examples illustrate the preparation of N-carboxy-α-amino acid anhydrides:

*Example 3*

Preparation of N-carboxy-L-alanine anhydride. Two hundred g. of L-alanine was pulverized, dried and suspended in 4,200 ml. of dioxane. The suspension was heated to 46–50° C. with vigorous agitation and gaseous phosgene was passed into the reaction mixture for 1 1./2 hours. The reaction mixture was then filtered to remove insoluble matter, and the filtrate was evaporated under reduced pressure at 50° C. until its volume was reduced to 250 ml. To this concentrated filtrate, 300 ml. of petroleum ether was added with ice-cooling and vigorous agitation. A crystalline product was formed. Further petroleum ether was added to complete the crystallization of the product with ice-cooling. The crude product, weighing 219 g., was collected from the reaction mixture by filtration. It was purified by recrystallization from 240 ml. of dioxane and 2,000 ml. of ice-cooled petroleum ether. The yield of purified product was 209 g. It was identified by elemental analysis, a N-carboxy-L-alanine anhydride. It melted at 87° C. Elemental analysis:

Calculated for $C_4H_5O_3N$: C, 41.70%; H, 4.35%; N, 12.20%. Found: C, 41.53%; H, 4.50%; N, 12.38%.

*Example 4*

Preparation of N-carboxy-γ-methyl-L-glutamic acid anhydride. 90 g. of γ-methyl-L-glutamic acid was pulverized and suspended in 700 ml. of dioxane.

About 1,500 ml. of dioxane was placed in a vessel bearing a gas-inlet and a gas-outlet, and stirred vigorously. Gaseous phosgene was passed at a controlled rate, and the suspension of γ-methyl glutamate was added drop by drop. The reaction mixture was kept at 50° C. until complete conversion of the γ-methyl-L-glutamic acid to the anhydride had been achieved. The solvent was removed by distillation under reduced pressure. The oily residue was triturated with petroleum ether. 100 g. of crude N-carboxy-γ-methyl-L-glutamic acid anhydride was obtained. The crude product was, recrystallized from 100 ml. of dioxane and 450 ml. of petroleum ether. The yield of purified product was 87 g.

*Example 5*

Preparation of other N-carboxy-α-amino acid anhydrides. Glycine, D-alanine, L-α-amino-n-butyric acid, L-valine, L-leucine, L-isoleucine, L-phenylalanine, β-methyl-L-aspartic acid and γ-ethyl-L-glutamic acid were also converted to the corresponding N-carboxy-α-amino acid anhydrides in the manner of Examples 3 and 4. The solvents used for preparation of these N-carboxy-α-amino acid anhydrides are listed in Table 4.

TABLE 4

PREPARATION OF N-CARBOXY-α-AMINO ACID ANHYDRIDES

| α-amino acid | Reaction medium | Recrystallizing solvent |
| --- | --- | --- |
| Glycine | Dioxane | Dioxane and Petroleum ether. |
| D-Alanine | do | Do. |
| L-α-amino-n-butyric acid | do | Chloroform. |
| L-Valine | do | Ethyl acetate and Petroleum ether. |
| L-Leucine | do | Ethyl ether and Petroleum ether. |
| L-Isoleucine | do | Do. |
| L-Phenylalanine | do | Ethyl acetate and Petroleum ether. |
| β-Methyl-L-aspartic acid | do | Chloroform. |
| γ-Ethyl-L-Glutamic acid | do | Ethyl acetate. |
| γ-Methyl-L-Glutamic acid | Ethyl acetate | Do. |
| L-Alanine | do | Do. |

Acylase for use in the invention may be obtained from various sources such as fungi, bacteria and animal tissues. One of the most economical sources of acylase is mycelium of *Aspergillus oryzae*, and the enzyme preparation extracted from the fungus. The following example illustrates the purification of acylase.

*Example 6*

Two kilograms Takadiastase (a fungal enzyme preparation extracted from the mycelium of *Aspergillus oryzae*; product of Sankyo Co., Ltd., Tokyo, trade name) were dissolved in 10 liters of distilled water and adjusted to pH 7.0. The solution was mixed with a filter-aid (Celite) and filtrated. 110 g. of calcium chloride was added to the filtrate which was readjusted to pH 7.5. The resulting precipitate was filtered off and extracted with 4.0 liters of 0.5 m./l. sodium sulfate solution. Further crystalline sodium sulfate was added to saturate the extract, and a precipitate which was formed thereby was collected by centrifuging. This fraction was dissolved in 500 ml. of distilled water and 82.04 g. of sodium acetate and 78 mg. of cobaltous chloride was added to this solution. After the solution had been adjusted to pH 7.8, it was heated to 65° C. for 5 minutes to inactivate any enzyme present other than acylase, and the solution was ice-cooled immediately. The resulting precipitate was filtered off and the filtrate was percolated over a column of Sephadex-G 25 (a molecular sieve, product of Pharmacia Co., Sweden). The effluent from the column, i.e., the protein fraction, was collected. The purified acylase, thus obtained, was used for preparation of water-insoluble acylase. The yield of the purified acylase solution was 930 ml.

The reaction of the purified acylase with the N-carboxy-α-amino acid anhydride is carried out in a buffer solution of pH 5–9, at low temperature since the activity of the product otherwise considerably diminished. The following examples illustrate the preparation of the water-insoluble acylase.

*Example 7*

A solution of purified acylase, which had been prepared as described in Example 6 and had a volume of 450 ml., was adjusted to pH 7.2 and sodium acetate and cobaltous chloride were added in amounts of m./15/l. and $10^{-4}$ m./l., respectively.

To this acylase solution, a solution of N-carboxy-γ-methyl-L-glutamic acid in dioxane (3.0 g./90 ml.) was added with agitation drop by drop while the reaction medium was kept at 2° C. by ice-cooling. Stirring was continued for 30 minutes, after the dioxane solution had been added, and the reaction mixture was thereafter kept in an ice-box for 20 hours at 2–4° C. The precipitate form in this period was collected by centrifuging at 0° C., and washed repeatedly with a solution of sodium acetate which contained cobaltous chloride. When ninhydrine-positive material could no longer be detected in the washings, the residue was collected and lyophilized. The water-insoluble poly-γ-methyl-L-glutamyl acylase thus obtained was a pale yellow granular material whose yield was 1.013 g. Its content of original acylase was calculated as 11.6% from the amount of unreacted N-carboxy-γ-methyl glutamate which was recovered from the reaction mixture. The acylase-activity of the water-insoluble acylase was assayed as 12.56 micro mol/mg./30 minutes for N-acetyl-DL-valine.

*Example 8*

A solution of acylase prepared as in Example 6 was lyophilized, and a powdered acylase preparation, weighing 1.225 g., was obtained. This preparation was dissolved in a m./15/l. phosphate buffer solution of pH 7.4. An ethyl acetate solution of N-carboxy-L-alanine anhydride (1.0 g./30 ml.) was added drop by drop to the acylase solution while the reaction mixture was held at 0° C. by ice-cooling. After the reaction mixture had stood at 2–4° C. for 19 hours, the precipitate formed was collected by centrifuging in a refrigerated centrifuge rotating at a rate of 12,000 r.p.m. The collected precipitate was repeatedly washed with an aqueous solution of sodium acetate (m./15/l., at pH 7.5), and lyophilized. The water-insoluble poly-L-alanyl acylase obtained was a brown powder and the yield was 0.3320 g. The activity of the water-insoluble acylase was assayed as 22.5 micro mol/mg./30 minutes for N-acetyl-DL-alanine.

The polymerization of N-carboxy-α-amino acid anhydride in a buffer solution is known (R. R. Becker and K. A. Stahmann; J. Biol. Chem., 204, 737–744 (1953), ibid., 745–752). However the copolymerization of N-carboxy-α-amino acid anhydride with acylase to produce water-insoluble acylase was not known before this invention. The reaction mechanism of the copolymerization has not yet been exactly determined, but following mechanism is being proposed. N-carboxy-α-amino acid anhydride reacts with a terminal amino radical of the acylase protein, whereby a bond between the amino group of the acylase-protein and the N-carboxy-α-amino acid is formed. A second N-carboxy-α-amino acid anhydride is then connected to the first N-carboxy-α-amino acid, and a polypeptide chain attached to the acylase protein thus grows step by step until the acylase protein becomes an integral part of a molecule of high molecular weight and thereby water-insoluble.

While the invention has been described with particular reference to specific embodiments, it is to be understood that it is not limited thereto, but is to be construed broadly and restricted solely by the scope of the appended claims.

What we claim is:

1. A water-insoluble copolymer of acylase with an N-carboxy anhydride of an optically active alpha-amino acid selected from the group consisting of glycine, alanine, alpha-amino-n-butyric acid, valine, leucine, isoleucine, phenylalanine, the beta-monoesters of aspartic acid, and the gamma-monoesters of glutamic acid.

2. A method of preparing a water-insoluble product having acylase activity which comprises polymerizing the N-carboxy anhydride of an optically active alpha-amino acid selected from the group consisting of glycine, alanine, alpha-amino-n-butyric acid, valine, leucine, isoleucine, phenylalanine, the beta-monoesters of aspartic acid, and the gamma-monoesters of glutamic acid, in an aqueous medium at pH 5 to 9 in the presence of acylase dissolved in said medium.

3. A method of selectively hydrolyzing one enantiomorph of an N-acyl-DL-amino acid which comprises contacting said acid in an aqueous medium with a water-insoluble copolymer of acylase with an N-carboxy anhydride of an optically active alpha-amino acid selected from the group consisting of glycine, alanine, alpha-amino-n-butyric acid, valine, leucine, isoleucine, phenylalanine, the beta-monoesters of aspartic acid, and the gamma-monoesters of glutamic acid.

References Cited by the Examiner

Bar-Eli et al.: Nature, Dec. 3, 1960, pages 856–857.
Greenstein: Article in Methods in Enzymology, vol. III (1957), pages 554–570.
Mitz et al.: J.A.C.S. 81, 4024–4028 (1959).

A. LOUIS MONACELL, *Primary Examiner.*

L. M. SHAPIRO, *Assistant Examiner.*